Aug. 22, 1950      P. L. HEXTER      2,519,371
PAINT WEIGHING MACHINE

Filed May 18, 1944      8 Sheets-Sheet 1

INVENTOR
Paul L. Hexter,
BY Leech & Radue.
ATTORNEYS

Aug. 22, 1950  P. L. HEXTER  2,519,371
PAINT WEIGHING MACHINE
Filed May 18, 1944  8 Sheets-Sheet 2

INVENTOR
Paul L. Hexter,
BY
ATTORNEYS

Aug. 22, 1950 P. L. HEXTER 2,519,371
PAINT WEIGHING MACHINE
Filed May 18, 1944 8 Sheets-Sheet 3

INVENTOR
Paul L. Hexter,
BY Leach & Padue,
ATTORNEYS

INVENTOR
Paul L. Hexter,
BY
ATTORNEYS

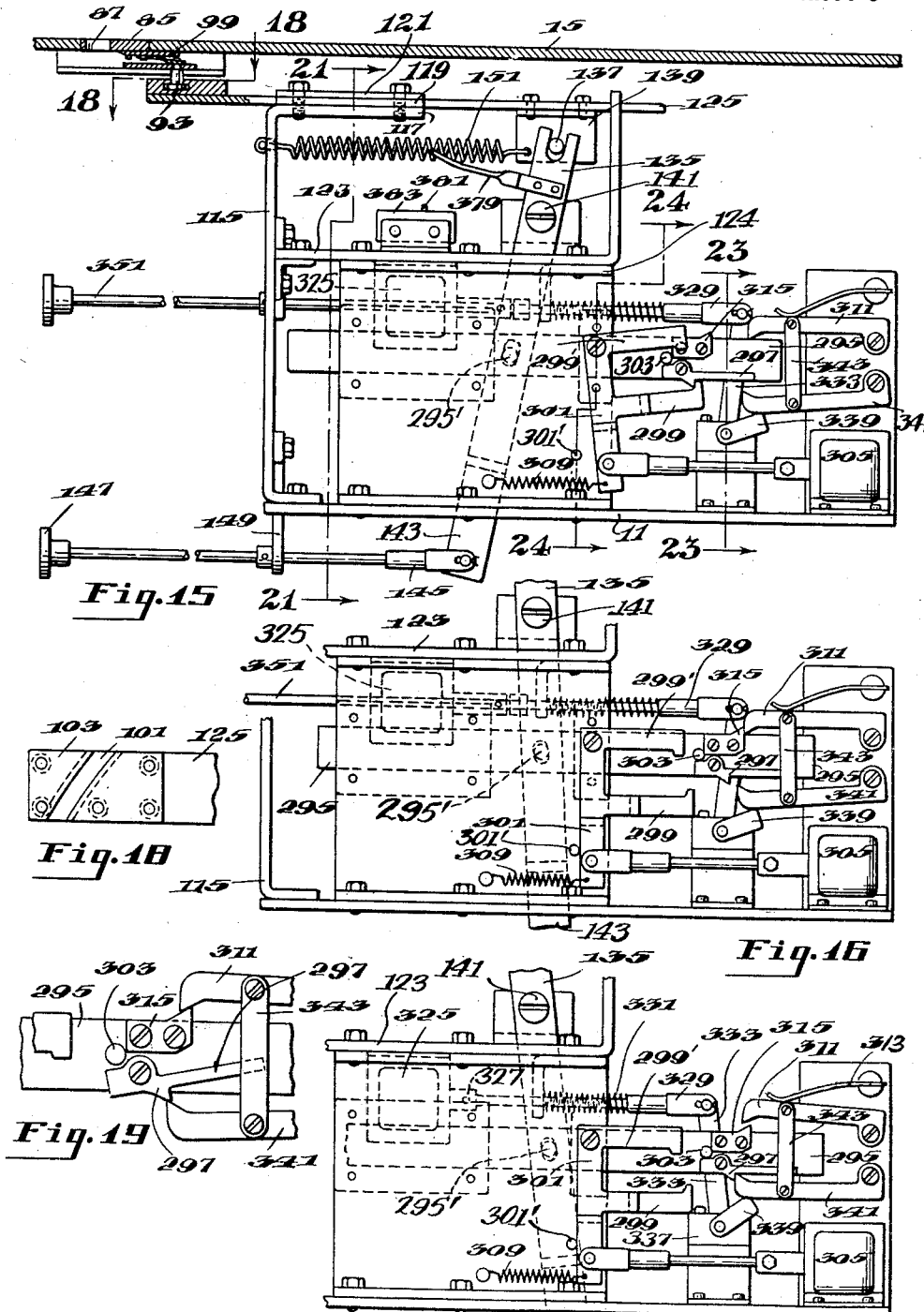

Aug. 22, 1950 P. L. HEXTER 2,519,371
PAINT WEIGHING MACHINE
Filed May 18, 1944 8 Sheets-Sheet 6
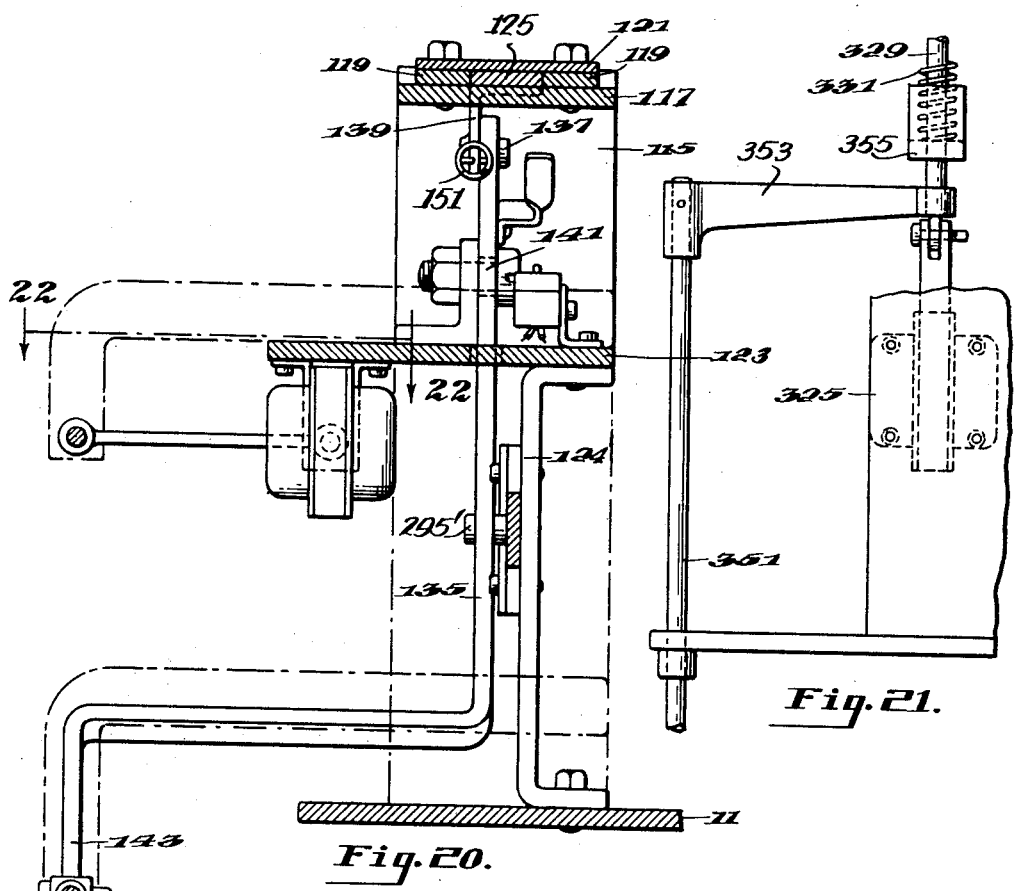
Fig. 20.
Fig. 21.
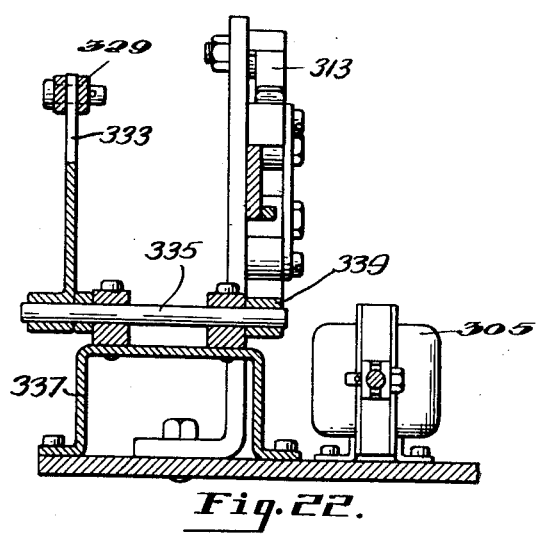
Fig. 22.
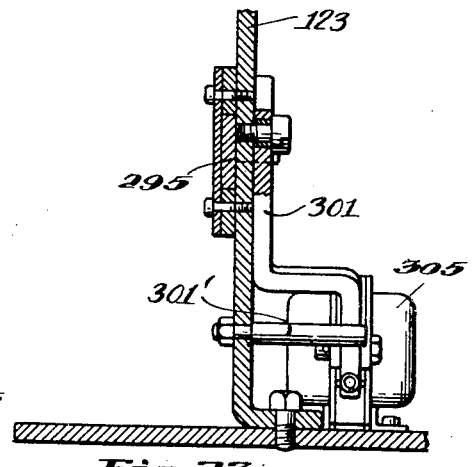
Fig. 23.
INVENTOR
Paul L. Hexter,
BY Leech & Radue,
ATTORNEYS Aug. 22, 1950          P. L. HEXTER          2,519,371

PAINT WEIGHING MACHINE

Filed May 18, 1944          8 Sheets—Sheet 8

Inventor

Paul L. Hexter,

By Leech & Radue

Attorneys.

Patented Aug. 22, 1950

2,519,371

UNITED STATES PATENT OFFICE 2,519,371

PAINT WEIGHING MACHINE

Paul L. Hexter, Cleveland, Ohio, assignor to The Arco Company, Cleveland, Ohio

Application May 18, 1944, Serial No. 536,181

6 Claims. (Cl. 249—14)

This invention relates to paint mixing and dispensing machines of the general type disclosed and claimed in my copending application filed September 17, 1943, Serial No. 502,825, which issued April 24, 1945, as Patent No. 2,374,430. The present machine is an improved and simplified construction over the paint dispensing and mixing machine disclosed in this prior application.

Essentially these machines comprise the combination of a plurality of base color storage receptacles mounted upon a horizontal rotary platform with individual dispensing valves for controlling the flow of material from each of the base color storage receptacles. The machines are provided with an accurate weighing device or scale with means for positioning a service can thereon for holding the dispensed material. Means are provided for adjusting the scale whereby as the weight of a predetermined amount of material is dispensed into the service can the valve controlling the dispensing and under the influence of the scale will be progressively closed. One of the essential features of the machine of the above identified patent and also a part of the present machine is the novel means of opening the dispensing valve for its maximum flow and as the weight of the dispensed material is deposited into the service can progressively closing the valve so that just before the precise amount of paint has been dispensed the flow will be cut down to a mere trickle and the operator does not have to take into consideration the weight of the stream of material from the valve to the surface of the paint in the service can.

An object of the present invention is to provide a simplified construction for handling and dispensing small quantities of several base colors of paint over the construction shown in my prior application. This improved apparatus accomplishes a more efficient handling of the several paints, both from the standpoint of accurate dispensing and from that of weighing the paint dispensed into the service can and the operation of the mechanism herein disclosed for progressively closing the dispensing valve is much simpler and smoother in operation than the mechanism disclosed in the patent issued on my prior copending application.

Another object of the invention is the novel means of adding base colors to the storage containers from cans of previously prepared paint, with the assurance that the can of prepared paint will be punctured and its contents run into the storage container without spillage or mess.

Another object is the simplified electrical circuit for controlling the initial opening of the dispensing valve positioned over a service can and the progressive closing of the valve through the medium of latches controlled by movement of the scale beam.

Another object is the improved form of power driven agitators whereby the paint in the several storage containers is kept in a thoroughly agitated and viscous condition to insure the paint materials dispensed therefrom are always of uniform consistency and shade. In addition, these paint storage containers may be made of transparent material so as to eliminate liquid level gauges and other cumbersome apparatuses for determining the amount of paint in the container, so at all times the operator can visually determine whether or not additional material should be added thereto.

One of the important features of this improved paint dispensing machine is the novel form or contour of the openings forming the valve discharge ports. My prior machine disclosed a dispensing valve having a circular bore through which the paint was dispensed into the service cans with the bore controlled by a knife blade which moved radially across the area of the circular bore. It has been found in practice that the use of a circular opening distorts the shape of the stream of paint being dispensed from a desirable smooth flowing stream of round cross-section to an irregular and non-circular formation. In the present machine the contour of the valve discharge bores is such that as the knife blade progressively closes the area of the bore it at all times maintains a substantially triangular discharge opening. This is accomplished by having the contour of the discharge opening non-circular but of substantially heart shaped form, or triangular or elongated, as will be described in the annexed specification. The advantages of a non-circular discharge opening are several, and include the maintaining of a circular stream of dispensed material which is non-clogging and permits the knife blade of the valve to seal off the opening more efficiently so that no seepage occurs. Thus, an efficient control of the shape and quantity of the paint flow is attained and a serial or progressive cutting down of the volume of a truly circular flow stream is secured instead of a wide flat irregular stream as in the case where a circular opening is used.

One of the objects of the present invention is to provide an improved form of power driven means whereby the paint in the several storage containers is kept in a thoroughly agitated condition whereby the materials dispensed are always of uniform viscosity and shade.

In the drawings:

Fig. 15 is an elevational view of the valve operating mechanism as illustrated in conjunction with other parts in Fig. 2 and enlarged with respect thereto, but showing the valve in the full open position;

Fig. 16 is an elevational view similar to Fig. 15 but with the valve operating mechanism shown in the relationship corresponding to a valve opening for a medium stream;

Fig. 17 is a view similar to Fig. 16 but showing the relationship of the mechanism corresponding to a valve opening for a fine stream;

Fig. 18 is a top plan view of the valve engaging bar as viewed from the line 18—18 of Fig. 15;

Fig. 19 is an enlarged elevational view showing the action of the pawls during opening of the valve;

Fig. 20 is an enlarged sectional view taken on line 21—21 of Fig. 15;

Fig. 21 is a plan view of the sliding connection between the solenoid plunger and the emergency shut-off stop rod, as viewed from line 22—22 of Fig. 20;

Fig. 22 is an enlarged sectional view taken on line 23—23 of Fig. 15;

Fig. 23 is an enlarged sectional view taken on line 24—24 of Fig. 15;

Figure 27:
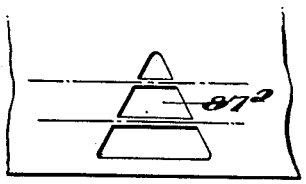
Figure 28:
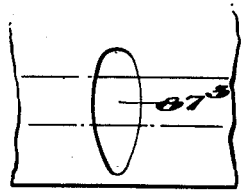

Fig. 27 is a modified form of discharge opening that is substantially triangular in cross-section but with cross bars across the opening and defining the large, medium and small streams; and Fig. 28 is still another form of the discharge opening and comprises an elongated generally oval slot over which the valve blade moves whereby as the valve approaches this closing position the stream is maintained in circular formation.

Figure 2:
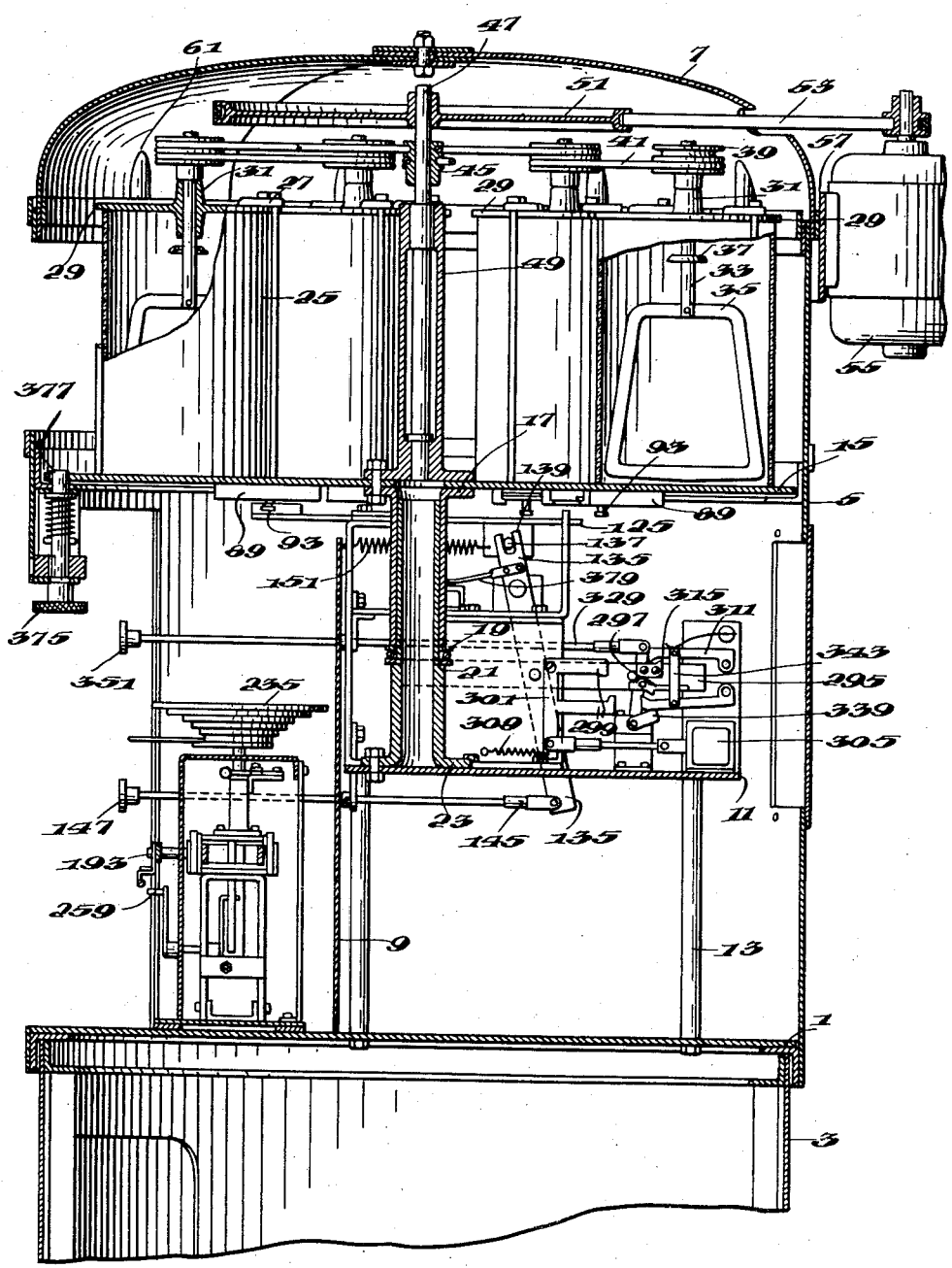
Fig. 2 is an elevational view in section, taken on the line 2—2 of Fig. 1.
Figure 3:
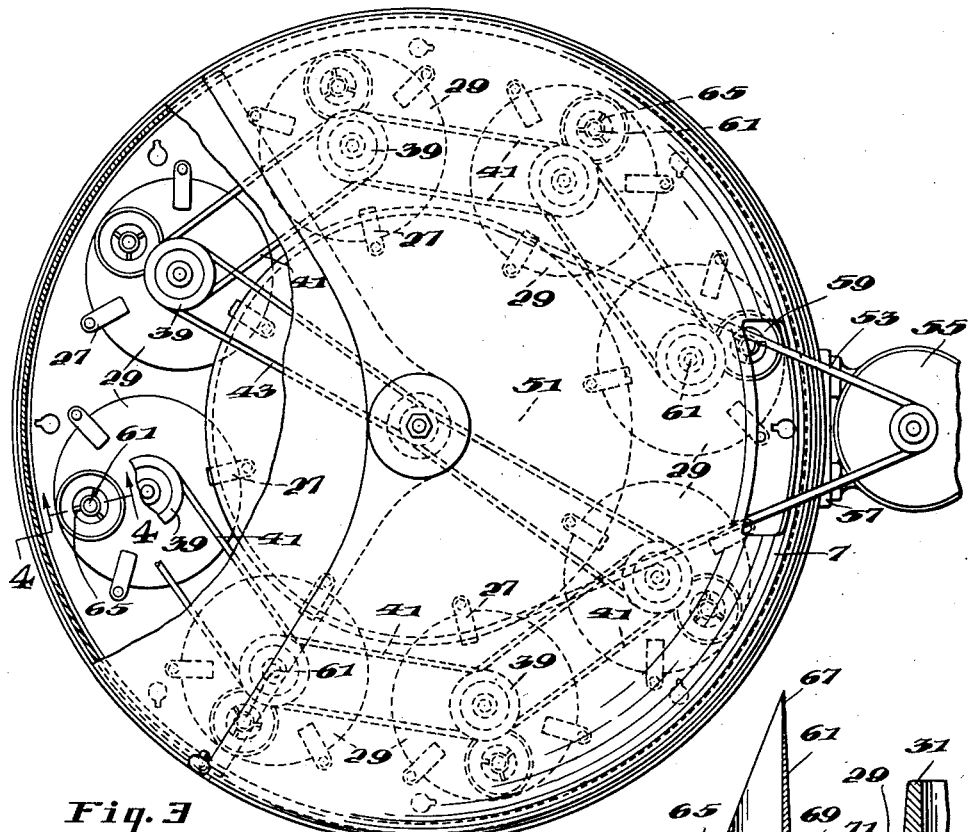
Fig. 3 is a top plan view with parts of the cover removed to better show the paint containers and the agitator driving means.

In the drawings the present improved and simplified paint mixing and dispensing machine is shown mounted on a circular platform 1 affixed to a lower cylindrical cabinet 3 with the paint storage compartments, weighing mechanism and valve operating gear contained in an upper cylindrical casing 5 having a dome shaped cover 7. The upper cylindrical casing 5 is cut away to give access to the inside thereof where the weighing apparatus is mounted. Behind the scale weighing mechanism is the valve operating gear and paint storage container driving mechanism separated from the open scale weighing part of the machine by a panel 9. The paint storage containers together with their agitating mechanism and the valve gear are mounted on a horizontal platform 11 held in elevated position by legs 13 bolted to the main base or platform 1. In raised position above the horizontal platform 11 is a circular rotatable table 15 bolted to a depending, hollow, flanged axle 17 having its lower end supported on an anti-friction bearing 19. This bearing is held on a radial step 21 formed on the telescoping cylindrical axle 23, the upper reduced portion of the tubular member 23 passing upwardly within the depending upper cylindrical axle 17. Thus the horizontal rotary platform 15 is freely rotatable to position one of the paint storage containers at the dispensing station overlying the weighing scale as will be hereinafter described. Preferably, though not necessarily, the paint storage containers 25 are transparent cylinders of glass or plastic resting on the rotary platform 15 and retained in fluid tight contact by means of bolt and lug assemblies 27, the inward ends of the lugs bearing against the cover plate 29 of the containers. Each cover plate is made with a central flanged bearing 31 therein for holding the shaft 33 of the paint agitating mechanism. On the lower part of the shafts 33 there are mounted triangular shaped paddles 35 which extend to approximately the bottom of the container adjacent the rotary platform 15. Each drive shaft 33 is fitted with a flared disc or splash plate 37 to prevent paint from climbing the rotating shaft. The outer ends of the agitating shafts 33 are fitted with a pair of superimposed drive pulleys 39 and adjacent pulleys are connected to one another by belts 41. While any number of paint storage containers may be used, as shown in Fig. 3 and by way of example only, there are eight storage containers mounted on the rotary platform 15, seven of which contain base colors and one a thinner or solvent. The containers are mounted in two series of four each with the belts 41 joining four adjacent containers and one container of each series driven by belts 43 engaging a double pulley 45 mounted on a central vertical shaft 47. This vertical shaft is positioned within an upper tubular holder 49 mounted in vertical longitudinal alinement with the telescoping tubular axles 17 and 23. The tubular member 49 is preferably flanged and rigidly secured to the flange on the upper tubular member 17 by bolts or other fasteners. The vertical shaft 47 is freely rotatable in the tubular holder 49 and receives movement for imparting to the agitating paddles of the various containers through an enlarged drive pulley 51 engaged by a belt 53 and driven by a suitable motor 55 mounted on a bracket 57 at the rear of the upper portion of the casing 5. As clearly indicated in Figs. 2 and 3 the motor driven belt 53 passes through a segmental opening 59 formed in the dome 7 of the casing. It will be obvious that when motor 55 is driven it will simultaneously rotate the several agitating paddles 35 of each storage container.

Figure 4:
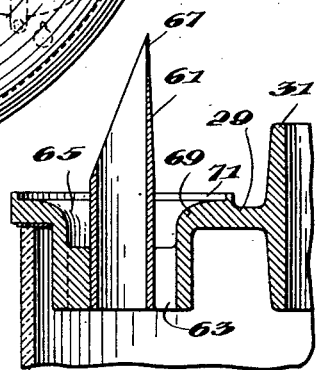
Fig. 4 is an enlarged sectional view through a filling spout taken on the line 4—4 of Fig. 3.

When it is desired to add material to any of the storage containers the operator may readily accomplish this by pressing a can of prepared paint on any of the upstanding puncturing edges 67 on the upper end of filler tubes 61 affixed to the storage container tops 29. This construction is shown in detail in Fig. 4 and comprises a vertically extending filler pipe 61 which is held in fixed position in the depending filling openings 63 formed in the container top 29. The filler pipe 61 is centrally located within the filling opening 63 by a series of radial arms 65 and the upper edge 69 of the opening 63 is downwardly curved and cooperates with the annular lip 71 extending around the opening so that any material which might run over or spill is directed into the opening 63. The upper edge of the filler pipe 67 is beveled and sharpened so it will readily puncture a can placed thereon and the spaces between the radial arms holding the filling tube 61 permit air to bleed out of the container as the paint level rises therein. If desired, an adjustable dust cap, not shown, may be placed over the tube 61 after the filling operation of the storage container is completed.

Figure 5:
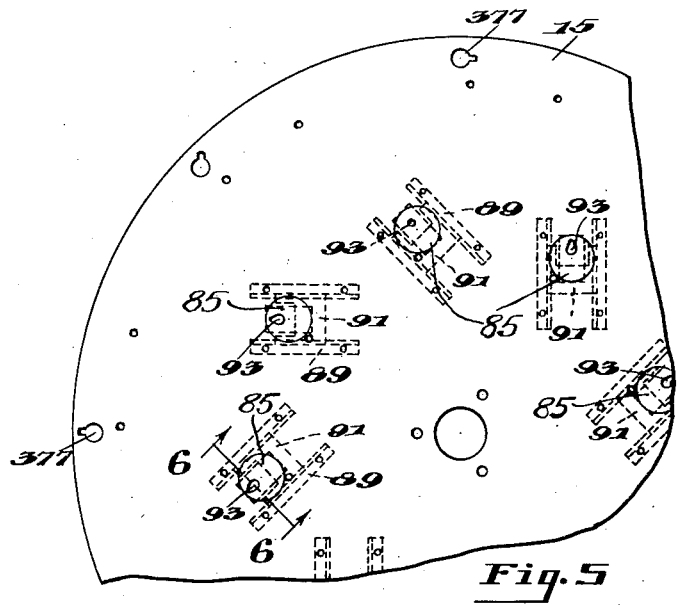
Fig. 5 is a top plan view of the turntable with all containers removed, and illustrating the arrangement of the valves.
Figure 6:
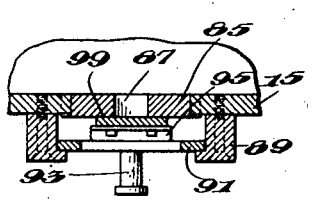
Fig. 6 is an enlarged sectional view through a typical valve, taken on the line 6—6 of Fig. 5.
Figure 7:
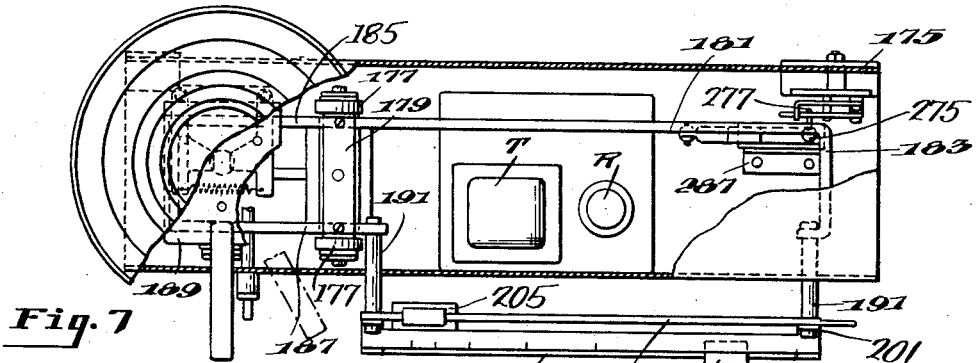
Fig. 7 is a top plan view of the weighing mechanism.

Directly beneath each storage container 25 and mounted within an opening cut in the circular rotary platform 15 are a plurality of circumferentially arranged and spaced apart dispensing valves. The details of structure of these valves are shown in Figs. 5 and 6 of the drawings. It will be seen that each valve comprises a circular plate 85 passing through an opening formed in the rotary platform 15. The contour of the discharge openings or passages 87, 87$^1$, 87$^2$ or 87$^3$ of each valve is shown in detail in Figs. 25 to 28. On either side of the valve plates 85 are a pair of spaced depending L-shaped guides 89 having a rectangular slide 91 supported on the inturned edges of the said guides 89. Each of the slides 91 is provided with a depending headed stud 93 for engagement with the valve actuator. Carried on the upper face of the slide plates 91 are leaf springs 95 bearing in an upwardly direction against a knife edge 99 adapted to open and close the dispensing opening 87. In operation the depending stud 93 is engaged by the undercut arcuate slot 101 formed by the spaced plates 103 secured to the end of a reciprocating valve actuating bar 125. The valve opening and closing mechanism is mounted on the horizontal platform 11 which also carries a vertically extending box frame comprising a U-shaped bar 115 having an inturned end 117 carrying spaced bars 119 and a cover plate 121. The opposite end of the box frame comprises an angle bar 123 joined to the base with its opposite end secured to a horizontal plate 124. One end of the plate 123 is upturned and provided with a central slot for holding the main valve actuating bar 125. The opposite end of the bar is supported and guided by the side bars 119 and cover plate 121. The arcuate valve stud engaging slot 101 is positioned on the outer end of the operating bar 125 and when moved to the right as viewed in Fig. 15 the slot 101 engaging the stud 93 of the selected valve moves it to fully open position. Movement is given the valve operating bar 125 through the medium of electrical solenoids energized by electrical circuits controlled by the weighing mechanism which will be described hereinafter in detail, by means of a forked arm 135 whose bifurcated end engages a lateral stud 137 affixed to a depending bracket 139 bolted near the rear end of the valve operating bar. This arm 135 is pivoted at 141 and extends downwardly and laterally to terminate in a depending end section 143. The end 143 is pivotally secured to a push rod 145 terminating in a knob 147 which extends through the front of casing 5. To maintain the push rod 145 in alinement it is passed through an offset guide 149 secured to one corner of the box frame. The coil spring 151 is affixed to the front member 115 of the box frame and to the depending bracket 139. Thus it will be observed that when the knob 147 is pulled outwardly it will rock the bifurcated lever 135 on its pivot 141 and retract the valve operating rod to withdraw the knife edge 99 from over the discharge opening 87.

The valve opening and closing mechanism is controlled by and combined with a service can weighing mechanism indicated generally by the numeral 175 secured to the platform 1 and lies within the opened front of the machine in spaced relation to the panel 9. The weighing mechanism which controls the valve mechanism includes a pair of spaced vertical members 177 which are notched for holding a knife edge 179 extending across and supported by the notches 180 formed in the upper ends of the vertical members 177. This forms the main balancing point for the weighing mechanism or scales. A rear scale bar or beam 181 is rigidly secured to the underside of the knife blade 179 and extends forwardly where it terminates in an angularly bent front portion 183 and rearwardly at 185 to form a support for the service can holding means. A second shorter and forwardly mounted beam 187 is also secured in spaced relation to the knife edge 179 and extends rearwardly where it is joined to the main beam 181 by a strap 189. The angularly bent forward end 183 of the main beam bar 181 and the front end of the auxiliary beam 187 are provided with offset bolts 191 which protrude laterally through slots cut in the front of the weighing apparatus. The bolts 191 are connected by a notched and calibrated scale bar 193 which terminates at its outer end in a pointer 195 for registering with a vertically arranged scale bar 197 secured on the face of the casing. The offset bolts 191 also carry a rod 199 secured to the bolts by hangers 201. A service can balancing weight 203 is adjustably mounted on or secured to the bar 199 for the purpose of balancing the scales when a service can is placed in position as will be hereinafter described. The notched calibrated bar 193 is arranged to have a dispensing weight 205 adjustably mounted thereon and this weight controls the amount of paint dispensed into the service can by indicating through the calibrations on 193 the weight of the paint dispensed.

Figures 9, 10:
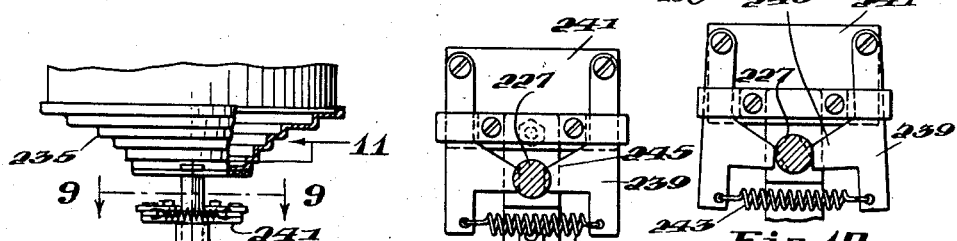
Fig. 9 is an enlarged plan view of the mechanism for adjusting the height of the scale platform and locking same in various positions, as viewed from line 9—9 of Fig. 8.
Fig. 10 is an enlarged view of the mechanism shown in Fig. 9 but with the scale platform revolved 30° to disengage the latch plates from the recesses in the platform supporting rod.

The rearward extensions of the scale beams 181 and 187 carry a second knife edge holding device comprising notched side pieces 215 joined by a transverse bar 217 secured to the undersides of the scale beams. The knife edge consists of a horizontal bar 219 having oppositely depending lugs 221 terminating in individual knife edges which rest on the notches formed in the side pieces 215. To prevent the knife edges from disengaging with their respective slots it is preferable to add side plates 233 to the outsides of the knife edges and extend these plates downwardly over the upper part of side members 215. Secured to the upper face of knife bar 219 is a tubular guide 225 through which is mounted a vertically adjustable rod 227 carrying a horizontal plate 229. An outwardly extending handle 231 is attached to the horizontal plate whereby the height of the rod 227 may be raised or lowered. A stepped service can holding plate 234 provided with increasing diameter steps 235 therein is secured to the horizontal plate 229. The diameter of the steps 235 accommodate the base of various sized cans whereby they are supported in a firm position for the reception of paint dispensed from the upper paint reservoirs. For the purpose of adjusting the can holding devices the supporting rod 227 is grooved throughout its length at spaced intervals indicated at 237 and these oppositely cut grooves are adapted to be engaged by pivoted fingers 239 secured to plate 241 fastened to the upper part of the tubular guide 225. Normally the pivoted fingers 239 are drawn towards each other by coil springs 243 whereby the inwardly porjecting parts 245 of the fingers engage opposite slots 237 cut in the rod 227 as shown in Fig. 9. When it is desired to raise or lower the rod 227 with its associated can holding device 234 the handle 231 is rotated slightly to disengage the parts 245 of the fingers 239 from the slots 237 that they are at the moment engaging as shown in Fig. 10. As soon as the parts 245 are in contact with the unslotted parts of the rod 237 the rod may be readily raised or lowered by the means of the handle 231. When the proper adjusting position is located the handle is moved back to its original position whereby the parts 245 engage the proper slots 237.

Figure 1:
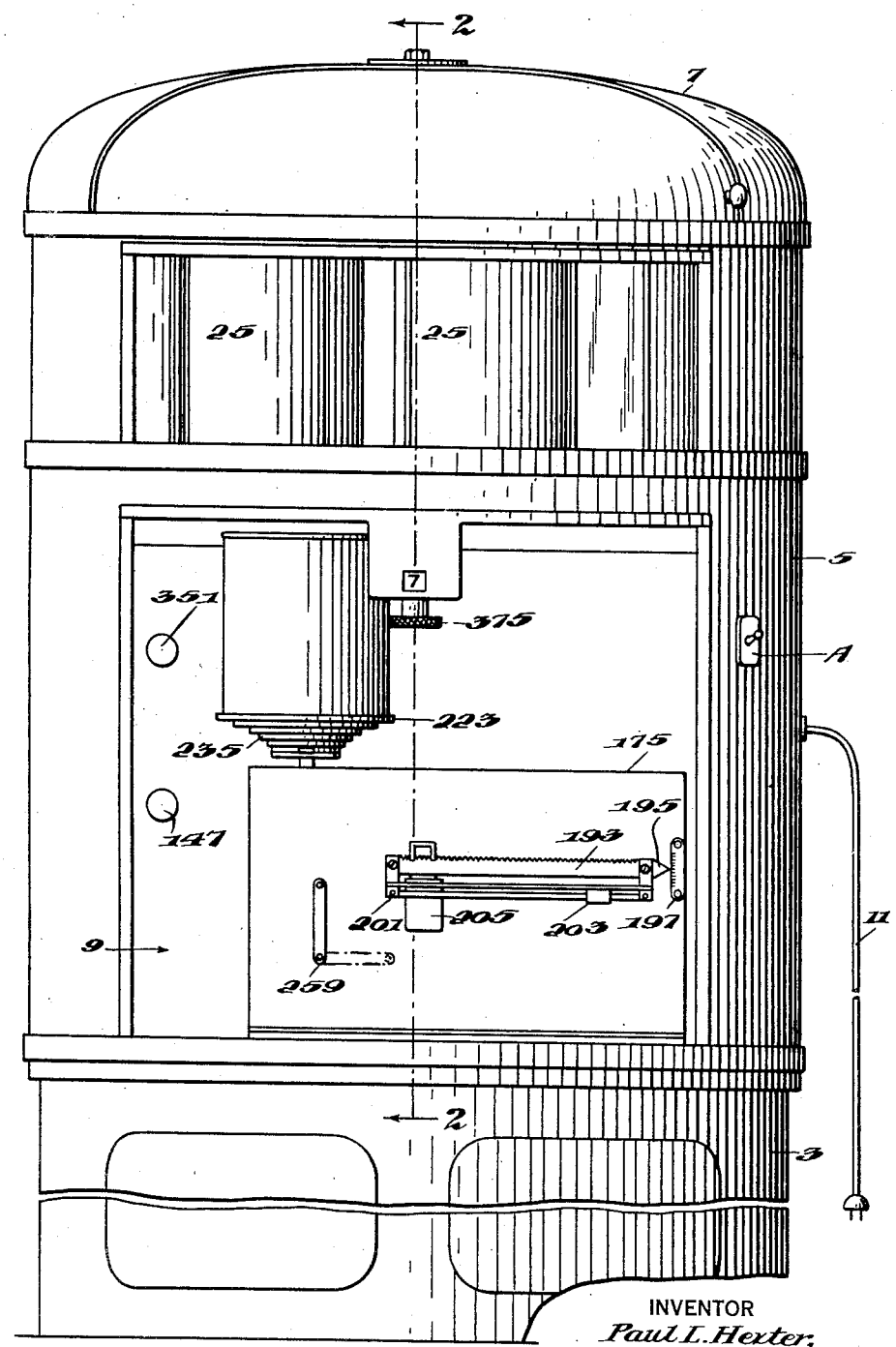
Fig. 1 is a front elevation of the complete machine.
Figure 8:
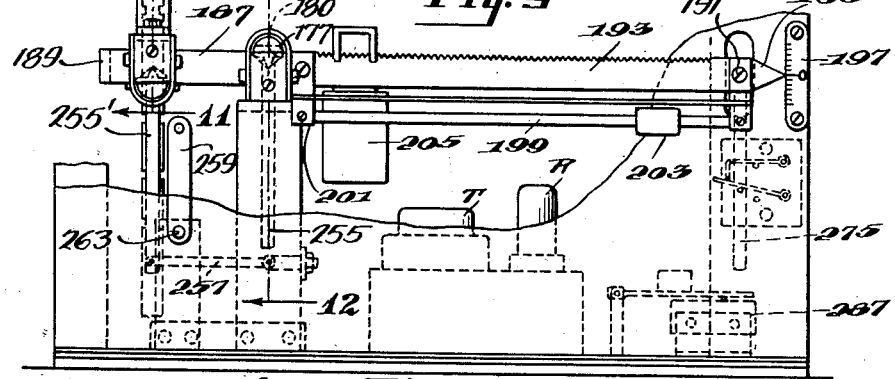
Fig. 8 is a front elevational view of the weighing mechanism, with parts of the enclosing cover removed.
Figures 11, 12, 13, 14:
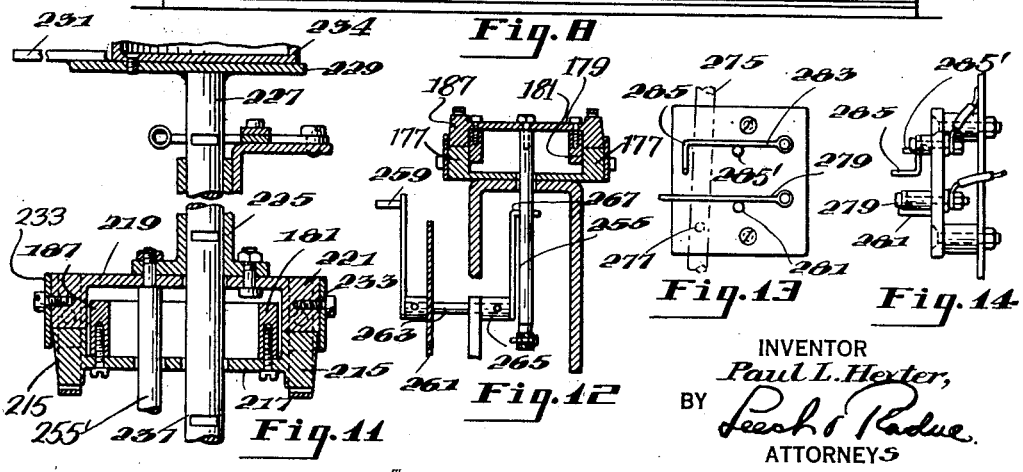
Fig. 11 is an enlarged sectional view taken on the line 11—11 of Fig. 8.
Fig. 12 is a fragmentary sectional view through the scale supporting pivots taken on the line 12—12 of Fig. 8 with certain parts broken away and showing the arrangement of lever and handle for locking the scale beam in the "up" position.
Fig. 13 is an enlarged view of the sensitive contacts of the electrical system, associated with the scale beam and shown in the positions they assume when the scale beam is in the down position.
Fig. 14 is a side elevation of the sensitive contacts shown in Fig. 13.

For the purpose of securing the weighing mechanism in fixed position when not in use it is provided with a keeper device which takes the form of a depending rod 255 pivoted to the lower arm 257 which is also pivoted at its outer end, in offset relation to and under rod 255, to the casing supporting the rear knife edge structure. The keeper comprises a rotatable handle 259 extending through the front wall 261 of the weighing apparatus on a shaft 263 having a collar 265 secured thereto which carries an arm 267. The outer end of arm 267 is bent so that when the handle 259 is in the dotted line position of Fig. 1 the arm 267 bears against the depending rod 255 and consequently holds the moving parts of the scale against clockwise rotation, as viewed in Fig. 8. In use the handle 259 is elevated to the full line position of Fig. 12 and thereby releases the several parts of the scale.

In operation the operator disengages the spring projected latch rod 375 from engagement with one of the openings 377 in the turntable 15 and manually rotates the turntable until the desired color container is in dispensing position. The latch rod 375 then engages with the opening 377 corresponding with the desired paint container and the turntable is thus held in fixed position. After this the operator pulls the knob 147 outwardly thus rocking the pivoted lever 135 attached to the valve slide 125 to fully open the selected dispensing valve. When the turntable is rotated the arcuate slot 101 engages the depending stud 93 of the selected valve, and when the main bar 125 is then retracted the knife blade 99 is moved past the dispensing opening 87. Prior to pulling out the operating rod 147 the electrical circuit of the machine has been closed to energize the motor 55 driving the individual paint container agitators. At this time the scale beam 193 is in horizontal position and the depending rod 275 attached at the outer end of the scale beam is in the position shown in Fig. 8. The rod 275 is provided with an offset pin 277 composed of insulating material cooperating with lower pivoted switch blade 279 that is normally held in this position on a stop pin and contact 281. A second pivoted switch blade 283 having a depending portion 285 normally rests on stop pin 285'. In the horizontal or neutral position of the scale beam in Fig. 8 it will be observed that the offset pin 277 has lifted the lower switch blade 279 into contact with the depending end 285 of switch blade 283. As soon as the service can has been placed on the can holding platform of the scale and the adjustable weight 295 positioned on the beam the outer free end thereof is depressed and thus the electrical contact between the switch blades 279 and 283 is opened. Simultaneously with the depressing of the rod 275 and the breaking of the circuit in switch arms 279 and 283, the lower end of the rod 275 contacts and closes the lower switch 287. Both of the switch blades 279 and 283 are grounded as will be hereinafter described when the electrical circuit per se is traced. The downward swing of the scale beam opens one circuit of the switch 287 and closes a second circuit. Following this initial setting of the machine in operation the hand operated rod 147 is pulled outwardly to fully open the valve as before described and consequently the pivoted operating lever 135 moves the latch bar 295, through its loose pivotal connection 295' therewith, to its extreme left position as shown in Fig. 15. As the pivoted lever 135 is operated the upper finger 379 carried thereon is raised from engagement with the button 381 of switch 383. The original position of the finger is illustrated in Fig. 2. Raising of the finger permits the contact 61 of switch 383 to close, as will be more specifically described in the explanation of the whole electrical system. When this occurs the lower pivoted latch dog 297 is engaged by the lower parallel arm 299 carried on lever 301 pivotally secured to the framework. Positive pivotal movement is imparted to the lever 301 and arm 299 by solenoid 305 whereby the lower arm 299 is raised to engage the dog 297 and the upper arm 299' is swung above the stop pin 303. As the paint is dispensed into the service can and the scale bar starts to ascend the circuit in solenoid 305 is broken through lower switch 287 and the spring 309 attached to the lever 301 disengages the lower arm 299 from contact with the dog 297. Simultaneously, the valve slide and valve assembly are moved by spring 151 to partially close the dispensing valve and to move the latch bar 295 to the right as shown in Fig. 16. This retrograde movement of the latch bar continues until the upper pivoted arm 311, urged downward by leaf spring 313, contacts the upper dog 315.

The paint continues to be dispensed until the weight thereof tips the scale beam sufficiently more to raise the insulated pin 277 on rod 275 and remove switch blade 279 from its closed position with contact 281. This completes the circuit to solenoid 325 and causes the armature 327 and link arm 329 thereof to be drawn inwardly against compression of spring 331. A depending arm 333 is pivotally secured to one end of the link arm 329 and at its opposite end to a transverse rod 335. This rod is supported through bracket plate 337 and is provided with a finger 339 that swings upwardly to raise the lower pivoted arm 341 which is connected to the upper arm 311 by pivoted link 343. When the finger 339 raises it lifts upper arm 311 from contact with dog 315 and places the lower arm 341 in position to hold against the dog 297 as the valve bar 125 is still further urged to the left. In this position shown in Fig. 17 the dispensing valve is almost closed and permits only a very fine stream of paint to still pass.

As soon as the scale beam rises and the insulated pin 277 through switch blade 279 contacts the switch blade 283 the solenoid 325 is deenergized causing the spring 331 to rock the finger 339 clockwise and cause disengagement of the arm 341 from dog 297. The valve bar through spring 151 thereupon closes off the dispensing valve completely.

To provide for emergency closing of the dispensing valve a push rod 351 is provided. The inner end of the push rod is equipped with a lateral arm 353 loosely engaging the armature rod 329 of solenoid 325. If it becomes necessary, the operator merely pushes the rod 351 to force the arm 353 against the stop collar and spring holder 355 to rock the finger 339 and thus quickly allow the dispensing valve to close.

Figure 24:
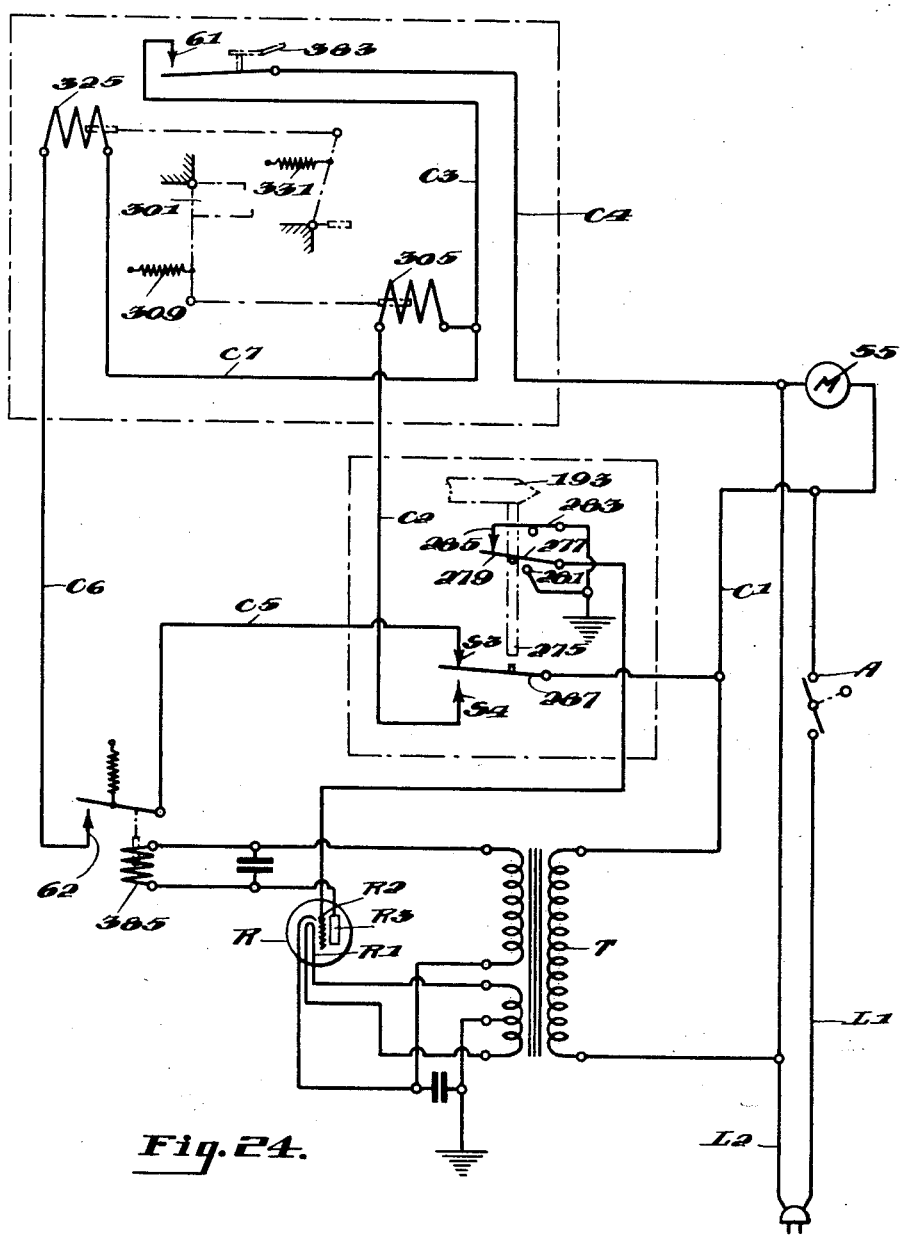
Fig. 24 is a wiring diagram of the electrical system.
Figure 25:
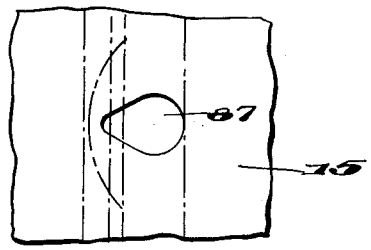
Fig. 25 is one form of the improved valve discharge port, which in this instance is of substantially heart shaped configuration.
Figure 26:
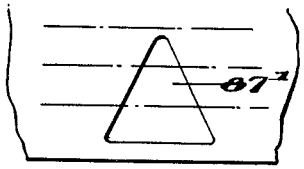
Fig. 26 is another form of the valve opening that is substantially triangular in shape.

The electrical system is diagrammatically shown in Fig. 24 and operates as follows:

Closing the main switch A starts the motor 55. Transformer T is also energized, causing the vacuum tube R to become active, $R_1$ being the heater, $R_2$ the grid, and $R_3$ the plate.

In the diagram the main circuits are illustrated in open position where the scale beam is horizontal and with the contact 285 closed. As soon as the scale beam "goes down" contact 285 is opened and contact 281 is closed. Since both 281 and 285 are grounded the grid $R_2$ of the tube R is still grounded except for a brief interval of time, and this portion of the circuit does not yet play any part in the measuring of the stream of paint; it does, however, function later on the "upward swing" of the scale beam. When the scale beam has reached the bottom of its downward swing, the end of rod 275 operates switch 287 and contact $S_3$ is opened and contact $S_4$ is closed.

It may be assumed for purposes of illustration that the conductor $L_1$ leading up from the plug is positive and conductor $L_2$ is negative.

At this time the operator pulls outward on the lower operating knob 147, thus opening the valve mechanically to its full discharge position. When the valve begins to open, the contact 61 of switch 383 is closed. Then current flows from $L_1$ through conductor $C_1$, through contact $S_4$ of switch 287, conductor $C_2$, solenoid 305, conductor $C_3$, contact 61, conductor $C_4$, and to conductor $L_2$. When solenoid 305 is energized, the bellcrank or lever 301 is moved so that the lower arm 299 latches under the projection on the lower side of the latch bar or dog 297 as shown in Fig. 15, thus holding the valve in the full open position. Paint continues to flow full stream until the scale beam begins to rise. Then contact $S_4$ is opened and $S_3$ closed. With contact $S_4$ open, current through solenoid 305 ceases, and lever 301 is pulled back to its normal position against stop 301' by spring 309, thus releasing the latch bar 295 and allowing the valve to close until the upper pawl or dog 311 engages the upper projection 315 on the latch bar. This allows a medium stream to flow as illustrated in Fig. 16.

As the scale beam approaches the horizontal position, the insulated pin 277 on rod 275 depending from the scale beam 193 lifts the bar 279 off the contact 281. Since the grid $R_2$ of the tube R is now ungrounded, the solenoid 385 becomes energized and closes relay contact 62. Then current flows from $L_1$ through conductor $C_1$, contact $S_3$, conductor $C_5$, contact 62, conductor $C_6$, solenoid 325, conductors $C_7$ and $C_3$, contact 61, conductor $C_4$, to conductor $L_2$.

With 325 energized, the bell crank 333 and finger 339 are moved so as to raise the upper pawl 311 out of engagement with the latch 315 and the lower pawl 341 into engagement with latch 297 as shown in Fig. 17, thus closing the valve to the fine stream position. The fine stream continues to flow until the bar 279 is again grounded on contact 285 which happens just as the scale beam reaches the horizontal position. Grounding of the bar 279 stops the plate current through the tube R and de-energizes the solenoid 385, thus opening the contact 62 and de-energizing solenoid 325. With solenoid 325 de-energized, the finger 339 and pawl 341 drop down, the pawl 341 releasing the latch bar 295 and allowing the valve to close completely.

To guard against the dispensing valve opening full when measuring small amounts of paint, provision is made to limit the movement of the latch bar. Thus, if the scale beam does not go all the way down and close contact $S_4$, current does not flow through solenoid 305 and the upper arm of the lever 301 remains in the path of the pin 303 on the latch bar 295 and prevents the valve being opened full. Of course the operator should immediately release the lower operating rod 147 as soon as it has been pulled out as far as possible. The upper operating rod 351 is an emergency means of closing the valve if for any reason solenoid 325 fails to become energized.

The paint dispensing machine disclosed and claimed in this application has a number of practical advantages over my copending application, Serial No. 502,825, filed September 17, 1943, now Patent No. 2,374,430. One of these advantages is the simplicity of the mechanism employed for opening and closing the dispensing valve in progressive or serial movement. Another advantage is the improved formation of the dispensing orifice per se, which insures that the stream of dispensed paint will always be circular in cross-section and solid in formation as distinguished from a fluttery irregularly shaped stream which results when a circular dispensing orifice is used. The latch holding and releasing mechanism for the valve operating member has been made more positive and facile in operation so that the cost of manufacturing the machine is greatly lessened. With the machine here disclosed the paint supplies in the several base color reservoirs may be readily replenished with the assurance that there will be no drippage or spill. Aside from the actual formation of the dispensing valve the cut-off plate thereof and its method of operation insure a smooth and completely dripless valve which may be serviced or replaced without difficulty.

It will be understood that the embodiments of the paint dispensing machine here disclosed may take various forms and shapes and it is not intended to limit the invention except as defined in the claims.

I claim:

1. A paint dispensing apparatus comprising a horizontal rotatable platform, a plurality of paint containers mounted on said platform, an individual dispensing valve for each of said containers on the underside of said platform, a weighing mechanism adjacent and below the path of said valves, means for supporting a service can on said weighing mechanism, a valve opening and closing mechanism constructed and arranged to detachably engage the dispensing valve of the paint container positioned directly above a service can supported on the weighing mechanism, spring means urging said valve opening and closing mechanism into valve closing position, a manually operable member connected with said valve mechanism to move said valve mechanism to valve opening position in opposition to said spring means, first latching means actuated in response to opening movement of said manually operable member for holding said valve mechanism in valve opening position, tripping means responsive to an increase in weight of paint in the can supported on the weighing mechanism for releasing said first latching means, and additional latching means for holding said valve mechanism upon release of said first latching means and responsive to further increases in weight of paint in said can subsequently to release said valve mechanism in steps to valve closing position.

2. A paint dispensing apparatus comprising a horizontal rotatable platform, a plurality of paint containers mounted on said platform, an individual dispensing valve for each of said containers on the underside of said platform, a weighing mechanism adjacent and below the path of said valves, means for supporting a service can on said weighing mechanism, a valve opening and closing mechanism constructed and arranged to detachably engage the dispensing valve of the paint container positioned directly above a service can supported on the weighing mechanism, said valve opening and closing mechanism being constantly biased to valve closing position and including a lever having a pivot connection with a fixed part of the apparatus, a reciprocable latch bar having a loose pivotal connection with said lever, a manually operable member connected with said lever to move said valve mechanism and latch bar to valve opening position, first latching means for holding said latch bar and the valve mechanism connected therewith in valve opening position, means actuated by opening movement of said manually operable member for moving said first latching means into holding relation with said latch bar, tripping means responsive to an increase in weight of paint in said can for releasing said first latching means, and additional latching means for holding said bar when released by said tripping means and subsequently releasing said bar in steps to valve closing position in response to further increase in weight of paint in said can.

3. Apparatus for dispensing paint comprising means defining a paint container with a discharge opening at the bottom surrounded by a plane horizontal surface, a knife edge slidable over said plane surface to regulate the size of said discharge opening, a weighing mechanism constructed and arranged to support a service can or the like in vertical registry below said discharge opening, a latch bar connected with said knife edge and constantly biased to normally maintain the knife edge in closed relation to said discharge opening, a manually operable member connected with the latch bar for moving said bar and knife edge to open said discharge opening, latching means associated with said bar for positively retaining the knife edge either in fully open or one of several intermediate partially open positions, and means responsive to increase in weight of paint in the can or the like supported by the weighing mechanism for sequentially operating said latching means to progressively release said bar and progressively close the container discharge opening with said knife edge.

4. In a paint dispensing and weighing apparatus, the combination comprising means defining a paint container with a discharge opening in the bottom surrounded by a plane horizontal undersurface, said opening being approximately triangular in shape and symmetrical about a central axis, means for weighing paint dispensed from said opening, a knife edge member, means constraining the knife edge member to slide in plane to plane contact over said plane undersurface and opening in a direction parallel to the said axis, said knife edge member being arranged with its edge perpendicular to said axis and facing toward the apex of said triangular opening to progressively vary the size of said opening while maintaining at all times an approximately triangular opening, producing a circular discharge stream, and means responsive to the weighing means for sliding the knife edge member over said opening.

5. In a paint dispensing and weighing apparatus, the combination comprising means defining a paint container with a discharge opening in the bottom surrounded by a plane horizontal undersurface, said opening being formed with an approximately triangularly shaped portion symmetrical about a central axis, means for weighing paint dispensed from said opening, a knife edge member, means constraining the knife edge member to slide in plane to plane contact over said plane undersurface and opening in a direction parallel to the said axis, said knife edge member being arranged with its edge perpendicular to said axis and facing toward the apex of the triangularly shaped portion of said opening to progressively vary the size of said portion while maintaining an approximately triangular opening, producing a circular discharge stream, and means responsive to the weighing means for sliding the knife edge member over said opening.

6. In a paint dispensing and weighing apparatus, the combination comprising means defining a paint container with a discharge opening in the bottom surrounded by a plane horizontal undersurface, said opening being ovate in shape and symmetrical about its longitudinal axis, means for weighing paint dispensed from said opening, a knife blade, means constraining the knife blade to slide in plane to plane contact over said plane undersurface and opening in a direction parallel to said axis, said knife blade being arranged with its edge perpendicular to said axis and facing toward the apex of said opening to progressively vary the size of said opening while maintaining at all times an approximately triangular opening producing a circular discharge stream, and means responsive to the weighing means for sliding the knife blade over said opening.

PAUL L. HEXTER.

REFERENCES CITED

The following references are of record in the file of this patent:

UNITED STATES PATENTS

| Number | Name | Date |
|---|---|---|
| 232,378 | Stokes | Sept. 21, 1880 |
| 1,280,827 | Patton | Oct. 8, 1918 |
| 1,824,394 | Crane | Sept. 22, 1931 |
| 2,053,456 | Arnold | Sept. 8, 1936 |
| 2,103,111 | Ekdahl | Dec. 21, 1937 |
| 2,158,795 | Grubelic | May 16, 1939 |
| 2,320,496 | Wechsler | June 1, 1943 |
| 2,374,430 | Hexter | Apr. 24, 1945 |

FOREIGN PATENTS

| Number | Country | Date |
|---|---|---|
| 953,193 | France | Nov. 18, 1939 |